(12) United States Patent
Schulnig et al.

(10) Patent No.: US 12,297,055 B2
(45) Date of Patent: May 13, 2025

(54) GRIPPING DEVICE FOR GRIPPING, RETAINING AND GUIDING CONTAINERS, AND TRANSPORTING APPARATUS HAVING SUCH A GRIPPING DEVICE

(71) Applicant: TYROLON-SCHULNIG GMBH, Hochfilzen (AT)

(72) Inventors: Ludwig Schulnig, St. Jakob in Haus (AT); Elmar Schulnig, St. Jakob in Haus (AT); Peter Mayer, Hochfilzen (AT)

(73) Assignee: TYROLON GMBH, Österreich (AT)

( * ) Notice: Subject to any disclaimer, the term of this patent is extended or adjusted under 35 U.S.C. 154(b) by 152 days.

(21) Appl. No.: 18/041,646

(22) PCT Filed: Jul. 28, 2021

(86) PCT No.: PCT/EP2021/071142
§ 371 (c)(1),
(2) Date: Feb. 14, 2023

(87) PCT Pub. No.: WO2022/048830
PCT Pub. Date: Mar. 10, 2022

(65) Prior Publication Data
US 2023/0322502 A1    Oct. 12, 2023

(30) Foreign Application Priority Data
Sep. 1, 2020   (EP) .................................... 20193870

(51) Int. Cl.
*B65G 47/86*   (2006.01)

(52) U.S. Cl.
CPC .... *B65G 47/847* (2013.01); *B65G 2201/0244* (2013.01)

(58) Field of Classification Search
CPC ...................... B65G 47/847; B65G 2201/0244
(Continued)

(56) References Cited

U.S. PATENT DOCUMENTS 5,711,411 A * 1/1998 Zurweller ............... B67C 3/242
                                                                198/470.1
9,193,538 B2 * 11/2015 Schulnig ................ B65G 37/00
(Continued)

FOREIGN PATENT DOCUMENTS

DE         10140315 A1     3/2003
JP       2009007018 A     1/2009
(Continued)

*Primary Examiner* — Gene O Crawford
*Assistant Examiner* — Lester Rushin, III
(74) *Attorney, Agent, or Firm* — Shumaker, Loop & Kendrick, LLP; James D. Miller

(57) ABSTRACT

A gripping device for gripping, holding and guiding containers, in particular bottle-like containers. The gripping device including at least one gripper arm pair having a first gripper arm as well as an oppositely designed second gripper arm, wherein both gripper arms have a respective bearing bore via which they can be pivotably mounted, and a closing means (or opening means) for the gripper arm pair. With the objective of providing a reliable opening mechanism, the first gripper arm has a contour lever and the second gripper arm has a follower lever in operative engagement with one another and serving as opening means (or closing means) for the gripper arm pair.

14 Claims, 4 Drawing Sheets

(58) Field of Classification Search
USPC .................................................... 198/470.1
See application file for complete search history.

(56) References Cited

U.S. PATENT DOCUMENTS

| | | | | |
|---|---|---|---|---|
| 10,800,614 | B2* | 10/2020 | Schulnig | B65G 47/846 |
| 11,453,560 | B2* | 9/2022 | Landler | B67C 7/004 |
| 12,162,739 | B2* | 12/2024 | Spandl | B67C 3/242 |

FOREIGN PATENT DOCUMENTS

| | | |
|---|---|---|
| JP | 2009161294 A | 7/2009 |
| JP | 2010023919 A | 2/2010 |
| WO | 2020108758 A1 | 6/2020 |
| WO | 2021191293 A1 | 9/2021 |

* cited by examiner

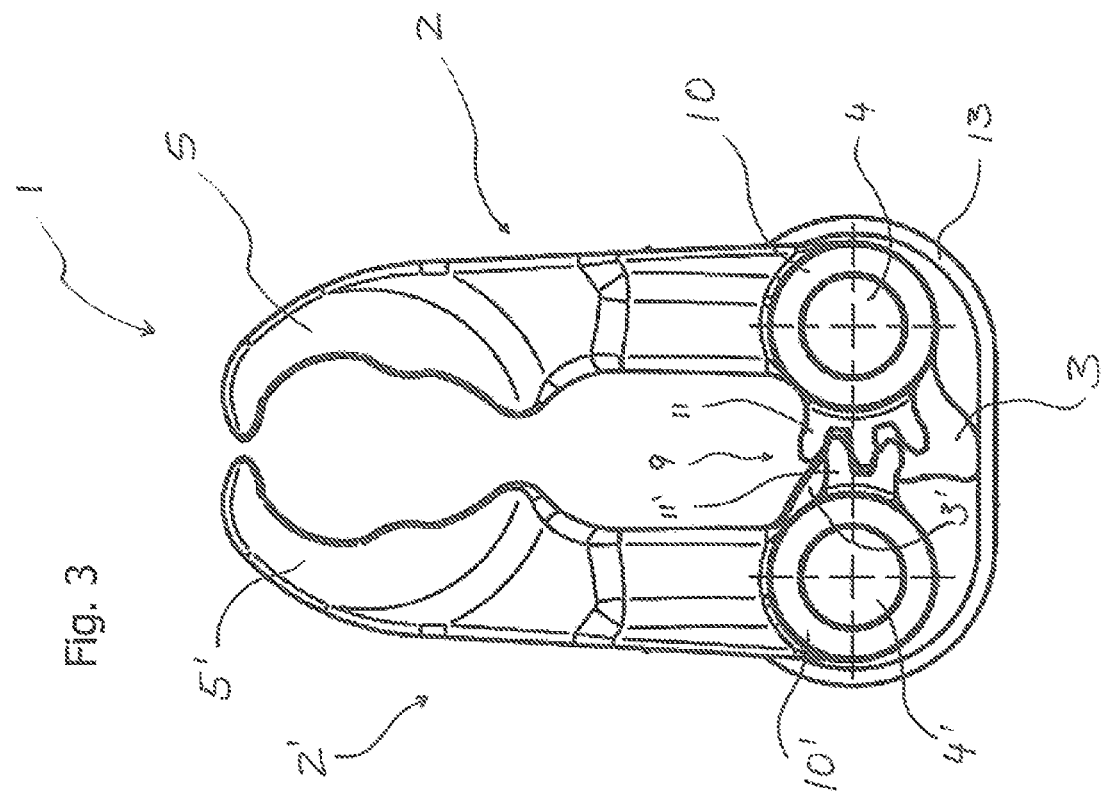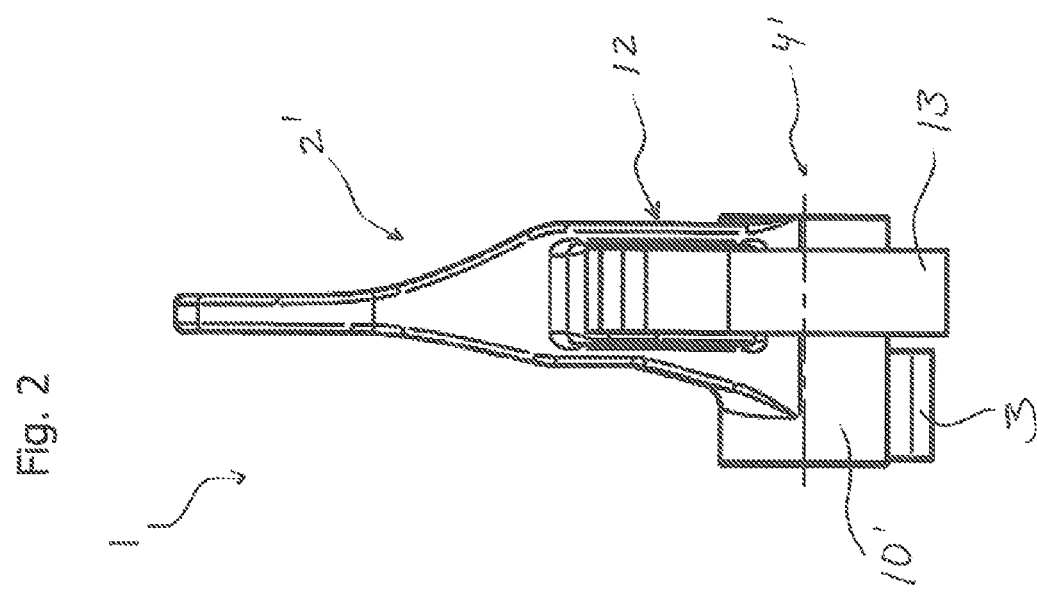

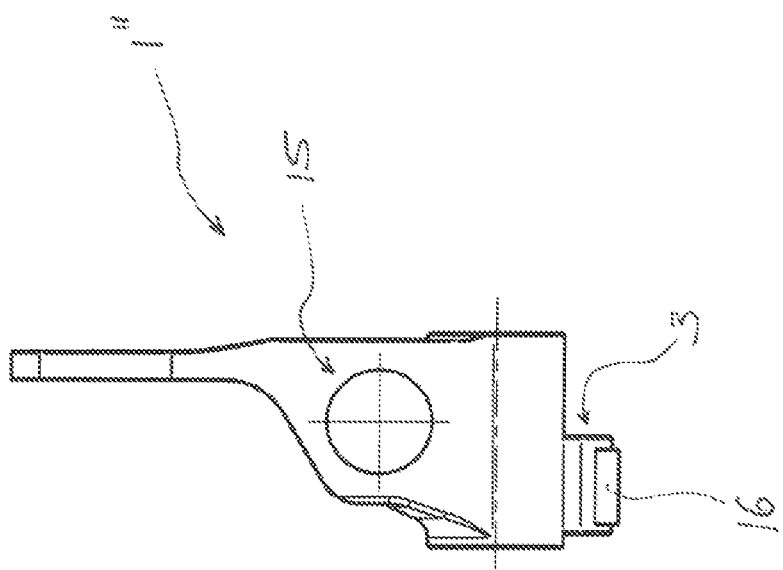
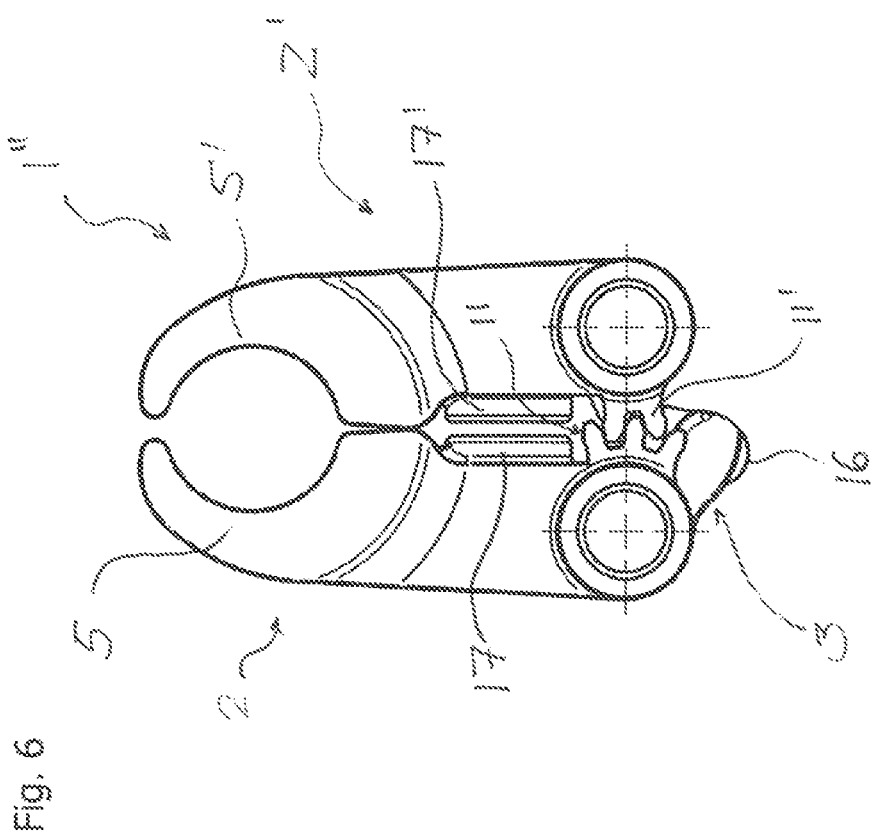

GRIPPING DEVICE FOR GRIPPING, RETAINING AND GUIDING CONTAINERS, AND TRANSPORTING APPARATUS HAVING SUCH A GRIPPING DEVICE

CROSS REFERENCE TO RELATED PATENT APPLICATIONS

This is a U.S. national phase patent application of PCT/EP2021/071142 filed Jul. 28, 2021 which claims the benefit of and priority to EP Appl. No. 20193870.1 filed on Sep. 1, 2020, the entire contents of each of which are incorporated herein by reference.

TECHNICAL FIELD

The invention relates to a gripping device for gripping, holding and guiding containers, in particular bottle-like containers, as well as a transport device having such a gripping device.

BACKGROUND ART

Gripping and transport devices for gripping, holding and/or guiding containers are already known from the prior art, particularly by the name of "clamping stars." They are primarily used in the production line processing of containers or receptacles particularly intended to be filled with liquids or other bulk goods. Such devices are also used in labeling machines which apply labels to a container, for example identifying the contents of said container, or even in cleaning or rinsing stations, so-called "rinsers."

To be understood by the term "container" in the context of the present invention is in particular, albeit not exclusively, containers having an essentially circular cross section, e.g. bottles, cans or glassware consisting of glass, metal or plastic according to the respective usage. To be understood by the term "bearing element" in the context of the present invention is in particular, albeit not exclusively, a particularly pin-shaped fixing element, e.g. in the form of a bearing pin, which rotatably fits into a socket scaled to the respective bearing element.

The bulk processing of such containers or receptacles requires the frequent opening and closing of the pair of gripper arms. Opening mechanisms to that end such as, for example, control cams or pivot shafts, are known from the prior art. With respect to the gripper arms, a positioning device is known which provides for an appropriate first and second toothed section on each respective gripper arm for operatively engaging with one another. The toothed sections support the opening mechanism and thus have the function of both force transmission as well as positioning since they ensure the planar alignment and synchronous movement of the gripper arms relative to one another.

One problem that exists in the prior art is that of the toothed sections being subjected to strong forces and consequently wearing out quickly. This is due to the fact that the force required to open or close the gripper arm pair only acts directly on one gripper arm and is transmitted to the second gripper arm via the toothed sections. Malfunction of a toothed section not only leads to stoppage of a filling facility; hygienic aspects within the production assembly line moreover need to be considered, particularly when filling or respectively subsequently processing foodstuffs or the like.

SUMMARY

The invention is based on the task of eliminating or at least minimizing the problems known from the prior art. In particular, the task is aimed at reducing the high degree of wear on the toothed sections of the gripper arms.

The invention solves this task with a gripping device as shown and described herein. Accordingly provided thereto is a gripping device for the gripping, holding and guiding of containers, in particular bottle-like containers, which has at least one pair of gripper arms comprising a first gripper arm and an oppositely designed second gripper arm, wherein both gripper arms have a respective bearing bore via which they can be pivotably mounted, and a closing means for the gripper arm pair. With the objective of providing a reliable opening mechanism, the first gripper arm comprises a contour lever and the second gripper arm comprises a follower lever which operatively engage with each other and serve as opening means for the gripper arm pair.

One advantage of a device designed as such is that the contour lever of the first gripper arm establishes a force-transmitting connection to the follower lever of the second gripper arm. An external force able to act directly on the contour lever is thereby directly transmitted to the follower lever. This results in the pair of gripper arms being brought from a closed into an open position. The direct transmission of force not only causes a pivoting movement of the first gripper arm but also a concurrent pivoting movement of the second gripper arm. This thereby provides a more reliable opening mechanism which can also be employed without toothed sections. Also due to the fact of these levers, also referred to as active engagement levers, being designed as opening means, and thus shaped and structured accordingly, the forces to be transmitted do not induce premature lever wear. Lastly, the probability of gripper arm pair failure is reduced or, respectively, the service life increased.

The gripping device according to the invention additionally has the advantage of consisting of few components, with known elements such as mounting plates, control camshafts and the like being dispensed with.

A further advantage of the inventive gripping device, in particular the contour lever of the first gripper arm and the follower lever of the second gripper arm, is lower material wear when activated and thus when opening the gripping device compared to a gripping device operated with a control camshaft or a pivot shaft as the actuating device.

Alternatively, the contour lever and follower lever can be designed as closing means and a pair of magnets or a spring element as opening means. The magnet pair is in this case designed as a repelling pair of magnets and arranged between the gripping section and the bearing axis of the gripper arms of a gripping device. The spring element is designed as an element which spreads apart in the gripping position, e.g. a spiral spring, and is arranged between the gripping section and bearing axis.

The contour lever and the follower lever are preferably configured such that there is maximum contact surface between the two levers at a specific pivot angle of the gripper arms. Therefore, when the two levers are operatively engaged, force is distributed over a surface and does not result in a point load on one of the levers. Material wear of the lever is thus reduced. The specific angle is in particular an opening angle at which the gripper arms remain in the open position for a specific period of time in order to grasp the next container.

It has thereby proven advantageous for the contour lever to have an effective section and the follower lever a first follower section and particularly a second follower section. The first follower section is formed adjacent to the second follower section and exhibits a contacting or contact surface with the effective section by means of which the pivoting movement of the contour lever is transmitted to the follower lever. During a pivoting movement of the gripper arms, e.g. when the gripper arms are opened, this contact surface shifts from the first follower section in the direction of the bearing of the gripper arm (with the follower lever) to the second follower section or vice versa. Furthermore, the second follower section is of at least partly complementary shape to the effective section and is in operative engagement with it at least for the most part or with the largest contact surface at a specific pivot angle. The complementary shape enables a continuous or maximum contact surface and thus an even distribution of transmitted force from the effective section of the contour lever to the second follower section of the follower lever. This thus eliminates point loading and reduces severe wear on the lever.

Particularly simple complementary designs are used in a further advantageous embodiment in which the effective section is of convex shape, the first follower section is of convex shape and the second follower section is of concave shape. This is to be understood in particular as arcuate or circular sections. Sections of such shape can be produced easily and quickly. In addition, this shape is advantageous for the levers, particularly when being guided along the sections, since the contact surface can be steadily increased in size and no abrupt movements or respectively jerking of the lever, and thus the gripper arms, results.

In order to stop the movement of the contour lever and thus the gripper arms, the contour lever preferably has an abutment section which enters into active engagement with an external side of the second gripper arm, in particular its hollow cylinder, at the specific or a second pivot angle, or respectively abuts against same, and prevents further pivoting. Since the gripping devices are integrated into transport devices which rotate in high motion and the gripping devices are driven just as quickly, the closing means often cannot decelerate the opening movement of the gripper arms quickly enough. This can lead to unwanted vibrations which facilitates wear of the interacting components of the gripper arms such as the lever or the toothed sections, for example.

The abutment section of the contour lever is preferably shaped in complementary form to the external side of the second gripper arm, in particular concavely. As a result, a wide area of the abutment section butts against the external side of the gripper arm and leads to a faster stopping or halting of the opening movement of the gripper arms.

In a further advantageous embodiment, the contour lever comprises an actuating section which is oppositely disposed from the effective section and can absorb a force for pivoting the first gripper arm. Due to this arrangement, the force of an actuating element on the actuating section of the contour lever is converted into a pivoting motion of the contour lever. This movement or force respectively is transmitted to the follower lever in essentially the same direction as the direction of the original force, particularly via the effective section.

Advantageously, the actuating section is of convex shape in order to absorb forces acting on the actuating section in a direction from a certain angular range a and leading to the pivoting of the first gripper arm. An actuating element used for interacting with the actuating section (and thus for opening the gripper arm pair) is usually arc-shaped and, due to its shape, presses against the contour lever of the gripping device rotating past. The edge of the actuating element is thereby usually formed at a certain angle or gradient in order to guide the lever along the actuating element. Due to the actuating section and in particular its shape, different actuating element gradients and thus different opening operation speeds of the gripper arm pair are possible.

Likewise of advantage is the configuration of the first and second gripper arm each having a geared or respectively toothed section. These sections are in operative engagement with one another and thus primarily yield movement or position synchronization of the two gripper arms. The gripper arms thus always have the same angle to a symmetrical axis which is concurrently the bisecting line between the first and second gripper arm. These sections additionally serve in force transmission, similar to the contour and follower levers.

For optimal space allocation and force transmission between the interacting components of the gripper arms, the geared sections are preferably formed along the bearing bore below or above the contour/follower lever.

Advantageously, one or more teeth of the geared sections is/are formed thinner than the contour and/or follower lever. This thereby saves on material, achieves a higher precision and the components are designed appropriately to their functions—toothed sections for synchronizing movement and the contour and follower lever for the transmission of force.

The present invention also provides a transport device for transporting containers which has one or more gripping devices according to the invention. The transport device is also referred to as a "clamping star" and in particular exhibits a rotational axis with a carrier plate on which the gripping devices are mounted.

The carrier plate is preferably annular or circular and designed so as to enable a positioning and securing of the one or more gripping devices on said carrier plate.

In a further advantageous embodiment, the gripping devices are equipped with a bolt-shaped and pivotable actuating element which is non-rotatably connected to the first gripper arm, in particular in its bearing bore, as a bearing element and has an actuating roller for pivoting the actuating element. The contour lever thereby no longer needs to be activated directly but instead directly transmits the pivoting movement of the first gripper arm initiated by the actuating element to the follower lever and thus to the second gripper arm.

Alternatively, an arc-shaped actuating element can be provided for activating the contour lever of the first gripper arm of the one or more gripping devices and thus for opening the gripper arm pair. Only one actuating element is thus needed for all the gripping devices, which saves material and costs.

The following features have not been specified in the claims, serve in clarification, and may be found in other advantageous embodiments:

The follower lever is formed by a pointed or lobe-shaped projection, in particular from an external side of the hollow cylinder of the second gripper arm. This shape is particularly stable and distributes an applied force evenly to the external side of the gripper arm on which the follower lever is formed or secured.

The second pivot angle for the abutment section comes before or after the first angle at which the maximum contact surface between the levers is obtained. It is thereby advantageous for the levers to be formed such that the contact surface steadily increases up to said first angle and/or decreases or remains the same after said angle.

In a further embodiment, the toothed sections exhibit radially arranged teeth at least segmentally on the exterior of the hollow cylinder for ensuring a positioning of the gripper arms relative to one another. This positioning device known per se from the prior art realizes the known prior art advantages. In particular, an exact positioning of the gripper arms relative to each other as well as an exact synchronism of the gripper arms is ensured. A further fundamental advantage by virtue of the present invention is that the positioning device is only used for positioning and does not itself transmit any force, which significantly extends the life of this device.

In functional terms, it has proven to be advantageous for two oppositely poled magnets to be used as closing means for the gripper arm pair in addition or alternatively to a leaf spring. The first magnet is located on the first gripper arm's inner side and the second magnet on the second gripper arm's inner side, in particular positionally coinciding with the first magnet. In the context of the present invention, the term "positionally coinciding" is to be particularly, albeit not exclusively, understood as two oppositely situated components which induce a positive connection upon the components coming into spatial proximity or contact. To be pointed out at this point is that depending on the facing poles and their arrangement relative to the bearing axes, two magnets can be used as closing means or opening means. Magnets as closing means are in particular used when handling PET or plastic bottles or containers since they are more pliable compared to glass or metal containers and could be damaged when spring elements are used as closing means.

In one advantageous development, the gripping device comprises one or more spring elements as force transmitters, preferably a pressure spring, leaf spring, torsion spring or tension spring, wherein one end of the spring element is situated on the inner gripper arm side of the first gripper arm and the second end of the spring element is situated on the inner gripper arm side of the second gripper arm. Using one or more spring elements, as known per se from the prior art, achieves the advantages known in conjunction with said spring elements. Spring elements as closing means are used in particular when handling bottles or containers having crown cork bottle caps and/or are made of glass or metal. Magnets as closing means could attract crown cork bottle caps and thus impede smooth transport of the containers. In addition, spring elements, which often apply stronger forces than magnets, cannot damage such containers. Lastly, depending on the design of the closing means as a magnet (pair) or spring element, it could require less maintenance, be less susceptible to contamination and/or easier to clean.

The gripping device, in particular the pair of gripper arms, can additionally comprise two bolts and a plate. The two bolts are thereby mounted or secured in the bearing bores of the gripper arm pair and are themselves fixed or rotatably mounted on a carrier plate or an extra retaining plate piece. The bolts can act as retaining or respectively bearing elements for the gripper arm pair. Should at least one of the bolts be additionally equipped with an actuating lever, the bolt can also pivot the gripper arm attached thereto and thus open or close the gripper arm pair.

The gripper arms can be made from different materials, in particular in one piece. Various manufacturing processes are thus available such as injection molding processes for plastic or sintering processes for ceramics or metal. A gripper arm made from ceramic preferably has a polished surface and thereby exhibits better chemical resistance and cleaning properties.

In a further advantageous embodiment, the gripper arm, in particular its gripping section, has so-called spikes, which are formed from the same material as the gripper arm or are part of the gripper arm respectively. These spikes are at least partially of pointy, wedged and/or hooked design and, when transporting a plastic container, gentle press into its outer circumference/surface and/or into the so-called neck ring of the container at the front from below. The spikes are minimally invasive and do not result in any, at least any significant, damage to the container. This in particular provides better stability and holding ability when gripping the container, as is necessary during some processes, e.g. when closing the container.

The gripping device can likewise comprise a stabilizing and guiding element which is designed such that a further stabilization point/region is provided adjacent to the gripping section of the gripping device. The body and/or base of the bottle is preferably guided through the element. The guiding element is passive and is only in contact with the container. It can thereby be configured semicircularly or in any other container shape into which the container can be placed and guided.

BRIEF DESCRIPTION OF DRAWINGS

The figures described in the following relate to a preferential exemplary embodiment of the inventive gripping device, whereby these figures serve not as a limitation but rather as substantially exemplifying the invention. Elements from different figures but having the same reference numerals are identical; therefore, the description of an element from one figure also applies to identically named and/or identically numbered elements in other figures.

Shown are:

FIG. 2 a side view of the gripping device from FIG. 1;

FIG. 3 a view from below of the gripping device from FIG. 1;

FIG. 6 a view from above of a gripping device according to a third preferential embodiment; and FIG. 7 a side view of the gripping device from FIG. 6.

DESCRIPTION OF AN EMBODIMENT

Figure 1:
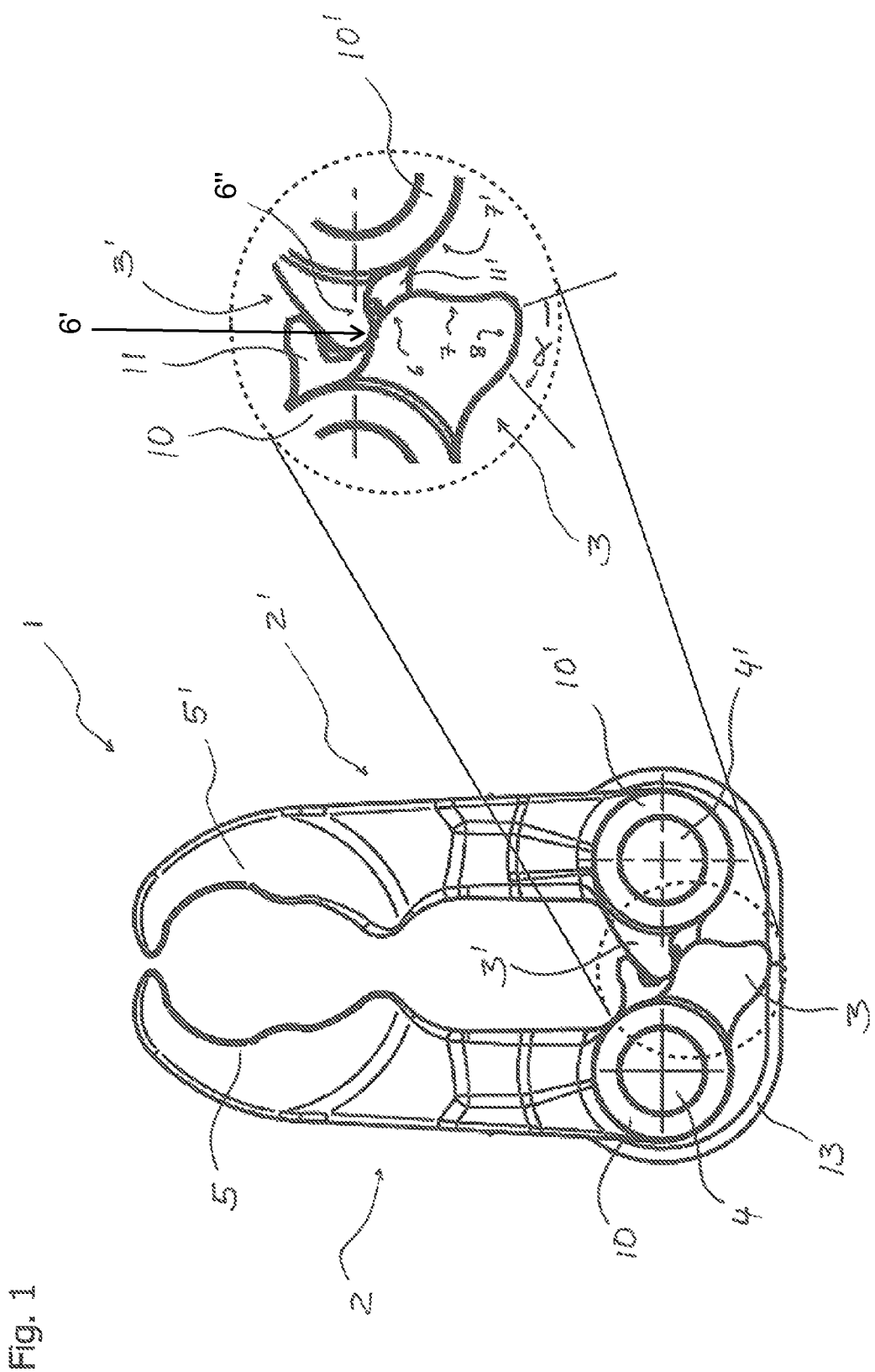
FIG. 1 a view from above of a gripping device according to a first preferential exemplary embodiment.

FIG. 1 shows a view from above of a gripping device according to a preferential exemplary embodiment which comprises a gripper arm pair 1 having two gripper arms 2, 2'. Both gripper arms 2, 2' are each of one piece and characterized by a gripping section 5, 5', a hollow cylinder 10, 10' (with bearing bore 4, 4'), a toothed section 11, 11' as part of a positioning device 9, and an active engagement lever 3, 3' as part of an opening mechanism of the gripper arm pair 1. In particular, the contour lever 3 of the first gripper arm 2 and the follower lever 3' of the second gripper arm 21 are in active engagement with one another as the active engagement lever. The same applies to the first toothed section 11 and the second toothed section 11'. Except for the toothed section 11, 11' and the active engagement lever 3, 3', the first gripper arm 2 is thereby of essentially opposite form from the second gripper arm 2'. The gripping section 5, 5' is designed to grip and hold the neck of a bottle and is arranged at a distance from the hollow cylinder. The hollow cylinder 10, 10', or bearing bore 4, 41 respectively, serves to accommodate a bearing pin (not shown) which, depending on the opening mechanism, is non-rotatably or rotatably inserted into the hollow cylinder 10, 10'. The toothed section 11, 11' and the active engagement lever 3, 3' are formed on an exterior side of the hollow cylinder. The gripping section 5, 5' is also connected to the hollow cylinder 10, 10'. The gripper arm pair 1 additionally has a closing means in the form of a leaf spring 13 which wraps around the gripper arm pair 1 like a clasp. The leaf spring 13 thereby exerts a force on the external sides of the gripper arm pair 1 such that the gripper arm pair 1 is closed or respectively guided into a gripping position. The toothed portion 11, 11' is arranged below the active engagement lever 3, 3'. The levers 3, 31 primarily serve in transmitting force from the first gripper arm 2 to the second gripper arm 21 and are therefore of wider configuration than the teeth of toothed sections 11, 11'. An enlargement of an area between the two hollow cylinders 10, 10' is shown to the right of the gripping device depicted in FIG. 1, particularly for better identification of the specifics of contour lever 3 and follower lever 3'. The contour lever 3 exhibits a convex effective section 6, a concave abutment section 7 and a convex actuating section 8 at the edge and in succession. The follower lever 31 is formed with a first convex follower section 61 and a second concave follower section 611 which are or can enter into active engagement with the effective section 6. A maximum contacting or contact surface is thereby formed between the effective section 6 and the second follower section 6" at a specific first pivot angle of gripper arms 2, 2'. During a pivoting movement, the effective section 6 and the first follower section 6' roll off each other. At the same or at a second pivot angle, the abutment section 7 butts against an external side or a braking section 7' respectively of the second hollow cylinder 10' and thereby stops a further movement of the contour lever 3 and thus also of the follower lever 31. The actuating section 8 enables an arc-shaped actuating element (not shown) to press against section 8 and thus initiate a pivoting or opening movement of the gripper arm pair 1. By virtue of the convex shape to the actuating section 8, the compressive force of the actuating element can come from different directions, which is why the actuating element for initiating the movement can come into contact with section 8 first within this angle.

FIG. 2 shows a side view of the gripping device from FIG. 1, particularly an external side of the second gripper arm 2' of the gripper arm pair 1. As described, the leaf spring 13 wraps around the gripper arm pair 1 and each end engages in a recess or slot 12 of the first or second gripper arm respectively. So that the gripper arm pair 1 can be opened by an actuating element (not shown), the contour lever 3 is arranged above the leaf spring 13. As a result, the contour lever 3 at the rear of the gripper arm pair 1—opposite gripping sections 5, 5'—is not obscured.

FIG. 3 shows a view from below of the gripping device from FIG. 1, particularly of the gripper arm pair 1 with the first and second gripper arms 2, 2'. In addition to the features previously described in relation to FIG. 1, the positioning device 9 in particular is clearly visible. The positioning device 9 comprises a first toothed section 11 on the exterior of the hollow cylinder 10 of the first gripper arm 2 and a second toothed section 11' on the exterior of the hollow cylinder 10' of the second gripper arm 2'. The first toothed section 11 is configured with three teeth while the second toothed section 11' is furnished with two teeth. They are in (interlocking) engagement with one another and primarily serve in synchronizing the pivoting movement or sequence of motion respectively of the first and second gripper arm 2, 2'.

Figure 4:
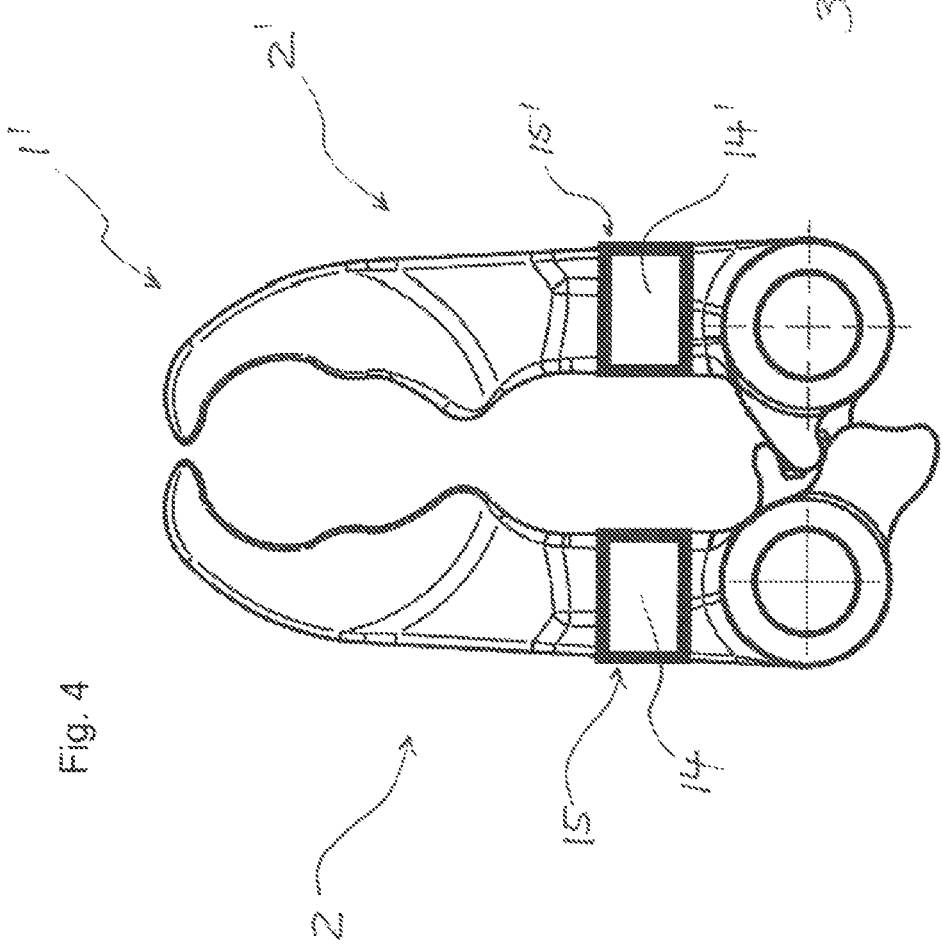
FIG. 4 a view from above of a gripping device according to a second preferential embodiment.

FIG. 4 shows a view from above of a gripping device with a gripper arm pair 1' according to a further preferential exemplary embodiment. With the exception of the blind holes 15, 15' having magnet elements 14, 14' as closing means, this gripping device exhibits the same features as the gripping device from FIG. 1. The blind hole 15, 15' extends from the external side of a gripper arm 2, 2' and is formed perpendicular to the bearing axis of a gripper arm. A magnet element 14, 14', particularly in the form of a permanent magnet, is integrated into the blind hole 15, 15' and secured by way of e.g. force fit or a fixing element. The two magnet elements 14, 14' have opposite polarity so as to attract each other and thus form the closing means of the gripping device. The attractive strength can be defined as a function of the strength and distance of the magnet elements 14, 14' from one another, wherein the distance is also determined by, among other things, the shape, in particular the depth, of the blind hole.

Figure 5:
FIG. 5 an enlarged view from above of an opening means of a gripping device according to a further preferential embodiment.

FIG. 5 shows an enlarged view from above of an opening means of a gripping device according to a preferential exemplary embodiment. The elements in this view are identical to the elements of the enlargement of the opening means from FIG. 1 as depicted to the right of the gripping device 1. In addition, the contour lever 3 on actuating section 8 has a reinforcing element 16 of partially cylindrical configuration on the actuating section 8; i.e. the reinforcing element 16 has a lateral surface which corresponds to a cylinder partially protruding from the actuating section 8. The reinforcing element 16 can be formed from the same material as the gripper arm and/or can be part of the one-piece gripper arm. Alternatively, the reinforcing element 16 can be formed as a cylinder and inserted and secured in a cavity or recess in the region of the actuating section 8 of the contour lever 3. The reinforcing element 8 has the advantage of additionally reducing wear on the actuating section and providing a more defined or faster reactive control.

FIG. 6 shows a view from above of a gripping device with a gripper arm pair 1" according to a further preferential exemplary embodiment. The gripper arm pair 1" has a first gripper arm 2 and a second gripper arm 2' which are pivotable to each other. So that the movement can run synchronously; i.e. the first gripper arm 2 and the second gripper arm 2' each executing an equal pivoting movement toward or away from each other, each gripper arm 2 and 2' has a toothed section 11 and 11' formed around the rotational axis or on the exterior of the hollow cylinder of a gripper arm 2 and 2' respectively. Compared to the gripper arm pair 1' from FIG. 4, the gripper arm pair 1" depicted here differs in the fully semicircular gripping sections 5 and 5', a wider arm extension between the hollow cylinder/bore and the gripping section, as well as more closely arranged blind holes for the magnets as closing means or blind hole exteriors 17 and 17' respectively. Moreover, the contour lever 3 and the follower lever (not visible) are formed below the toothed sections 11 and 11'.

FIG. 7 shows a side view of the gripping device having a gripper arm pair 1" from FIG. 6. Primarily visible here is the first gripper arm 2 with contour lever 3. The contour lever 3 comprises the cylindrical reinforcing segment 16 which, in terms of volume, is mostly inserted or respectively arranged in the contour lever 3. The opening of the blind hole 15 is formed on the exterior of the gripper arm 2 not facing the other gripper arm. A preferably cylindrical magnet which acts as a closing means with the other magnet of the other gripper arm is inserted through the opening.

LIST OF REFERENCE NUMERALS 1 gripper arm pair (1st embodiment)
1' gripper arm pair (2nd embodiment)

1" gripper arm pair (3rd embodiment)
2 first gripper arm
2' second gripper arm
3 contour lever (as opening means)
3' follower lever (as opening means)
4 first bearing bore
4' second bearing bore
5 gripping section (of first gripper arm)
5' gripping section (of second gripper arm)
6 effective section
6' first follower section (convex)
6" second follower section (concave)
7 abutment section
7' braking section
8 actuating section
9 positioning/synchronizing device
10 hollow cylinder (of first gripper arm)/bore
10' hollow cylinder (of second gripper arm)/bore
11 first toothed/geared section
11' second toothed/geared section
12 recess/slot (for leaf spring)
13 leaf spring (as closing means)
14 magnet element (as closing means) of first gripper arm
14' magnet element (as closing means) of second gripper arm
15 blind hole of first gripper arm
15' blind hole of second gripper arm
16 reinforcing segment/element
17 exterior side of first gripper arm blind hole
17' exterior side of second gripper arm blind hole

The invention claimed is:

1. A gripping device for gripping, holding and guiding containers, comprising:
at least one gripper arm pair having a first gripper arm as well as an oppositely designed second gripper arm, wherein both of the first gripper arm and the second gripper arm have a respective bearing bore via which the first gripper arm and the second gripper arm can be pivotably mounted; and
a closing means or an opening means for the gripper arm pair, wherein the first gripper arm has a contour lever and the second gripper arm has a follower lever in operative engagement with one another and serving as the opening means or the closing means for the gripper arm pair, and wherein the first gripper arm and the second gripper arm each have a respective toothed section in operative engagement with each other for movement synchronization or positioning of the first gripper arm and the second gripper arm.

2. The gripping device according to claim 1, wherein the contour lever and the follower lever are formed such that there is a maximum contact surface between the contour lever and the follower lever at a specific pivot angle of the first gripper arm and the second gripper arm.

3. The gripping device according to claim 1, wherein the contour lever has an effective section and the follower lever has a first follower section, whereby in particular the effective section is convex in shape and the first follower section is convex in shape.

4. The gripping device according to claim 2, wherein the contour lever has an abutment section which enters into active engagement with or butts against a braking section of the second gripper arm at the specific pivot angle, thereby stopping a further pivoting.

5. The gripping device according to claim 4, wherein the abutment section of the contour lever is shaped in complementary form to the braking section of the second gripper arm, in particular concavely.

6. The gripping device according to claim 3, wherein the contour lever comprises an actuating section oppositely disposed from the effective section and able to absorb a force for pivoting the first gripper arm.

7. The gripping device according to claim 6, wherein the actuating section is convex in shape in order to absorb forces acting on the actuating section in a direction from a certain angular range a and leading to the pivoting of the first gripper arm.

8. The gripping device according to claim 1, wherein the toothed sections are formed along an exterior side of a hollow cylinder of the first gripper arm and the second gripper arm and below or above the contour lever or the follower lever respectively.

9. The gripping device according to claim 1, wherein one or more teeth of the toothed sections is/are formed thinner than the contour lever and the follower lever.

10. The gripping device according to claim 1, wherein the closing means or the opening means is configured as a leaf spring, another type of spring, and/or as a pair of magnet elements.

11. The gripping device according to claim 1, wherein the gripping device in each case comprises a bearing pin for pivotably securing a respective one of the first gripper arm and the second gripper arm.

12. A transport device for transporting the containers which has one or more of the gripping devices according to claim 1, wherein an annular carrier plate is designed so as to enable a positioning and a securing of the one or more of the gripping devices on the carrier plate.

13. The transport device according to claim 12, wherein a bolt-shaped and pivotable actuating element is non-rotatably connected to the first gripper arm, in particular in the bearing bore of the first gripper arm, as a bearing element and having an actuating roller for pivoting the actuating element.

14. The transport device according to claim 12, wherein an arc-shaped actuating element activates the contour lever of the first gripper arm of the one or more of the gripping devices and thus for opening or closing the at least one gripper arm pair.

* * * * *